United States Patent

[11] 3,609,100

| [72] | Inventor | Theodore F. Niemann<br>Brecksville, Ohio |
|---|---|---|
| [21] | Appl. No. | 862,961 |
| [22] | Filed | Oct. 1, 1969 |
| [45] | Patented | Sept. 28, 1971 |
| [73] | Assignee | The BF Goodrich Company<br>New York, N.Y. |

[54] BLOCK COPOLYMERS OF POLAR MONOMERS
6 Claims, No Drawings

| [52] | U.S. Cl. | 252/431 R, 260/881 |
|---|---|---|
| [51] | Int. Cl. | C08f 15/38 |
| [50] | Field of Search | 252/431; 260/881 |

[56] References Cited
UNITED STATES PATENTS
3,149,182  9/1964  Porter ............ 252/431 R X

*Primary Examiner*—Patrick P. Garvin
*Attorneys*—J. Hughes Powell, Jr. and Ernest K. Bean ABSTRACT: Polar monomers can be polymerized to obtain block copolymers by the sequential addition of the polar monomers. The polymerization is initiated with an organolithium compound in combination with a heterocyclic compound containing a sulfur heteroatom. Acrylonitrile, methacrylonitrile and alkyl acrylates and methacrylates are copolymerized to two- and three-block copolymers with an initiator system consisting of an alkyl lithium compound and five- or six-membered heterocyclic compound or fused heterocyclic ring system derived therefrom, where the heteroatom is sulfur which may be unsubstituted or contain one or two oxygen atoms bonded thereto but external to the ring.

BLOCK COPOLYMERS OF POLAR MONOMERS

BACKGROUND OF THE INVENTION

Anionic polymerization of nonpolar monomers to obtain block polymers is known. Such polymerizations are typically conducted by the sequential addition of the nonpolar monomers into the anionic polymerization media or the anionic polymerization of mixtures of the monomers. Organolithium compounds generally function as initiators for these polymerizations.

The same anionic polymerization techniques are not generally applicable, however, for the formation of block polymers when polar monomers are to be employed. In the presence of polar monomers termination of the growing polymer chain results and low molecular weight polymers having little or no utility are obtained. Variations in catalyst concentration, catalyst type, polymerization media and polymerization temperature have been studied in an effort to obtain useful block polymers with polar monomers, however, no completely acceptable method has been reported. n-Butyl lithium has been employed under a variety of polymerization conditions for the homopolymerization of polar monomers, including methacrylonitrile and methyl methacrylate, but two- and three-block copolymers of methacrylonitrile and methyl methacrylate were not obtained employing these same polymerization techniques.

SUMMARY OF THE INVENTION

I have now discovered an effective initiator system for the block copolymerization of polar monomers. The present process and initiator system permit the copolymerization of polar monomers such as acrylonitrile, methacrylonitrile or alkyl acrylates and methacrylates to obtain two- and three-block copolymers. The process consists of the sequential addition of the polar monomers to the polymerizing media containing an initiator system comprising an organolithium compound and a heterocyclic compound containing a sulfur heteroatom. Sulfur-containing heterocyclics will be five- or six-membered ring compounds, saturated or containing unsaturation, wherein the sulfur heteroatom may be unsubstituted or contain one or two oxygen atoms bonded thereto but which are not a part of the ring. The process will ordinarily be conducted in an inert hydrocarbon solvent. The molar ratio of the heterocyclic compound to the organolithium compound will generally range between about 3:1 to about 0.5:1. About 20 to about 500 millimols organolithium compound per mol of the initial monomer charged will be employed to initiate the polymerization.

DETAILED DESCRIPTION

The present invention relates to the block copolymerization of polar monomers. The polymerization is initiated with an organolithium compound in combination with a heterocyclic compound wherein the heteroatom is sulfur. The organolithium compounds employed are of the general formula $R-(Li)_x$ wherein R is an aliphatic, aromatic or cycloaliphatic hydrocarbon radical containing from one to 12 carbon atoms and $x$ is 1 or 2. Typical organolithium compounds include: methyl lithium, isobutyl lithium, n-butyl lithium, sec-butyl lithium, t-octyl lithium, n-decyl lithium, phenyl lithium, naphthyl lithium, 4-butyl lithium, p-tolyl lithium, cyclohexyl lithium, 4-butylcyclohexyl lithium and the like, or mixtures thereof. Excellent results have been obtained with alkyl lithium compounds wherein the alkyl group contains one to six carbon atoms. In addition to organolithium compounds, organosodium or organopotassium compounds may be employed for the polymerization.

In preparing two- or three-block copolymers, organolithium compounds containing one carbon-metal bond are most often employed and the monomers to be polymerized are added sequentially. This produces polymer anions propagating or growing at one end only. Organolithium compounds containing two or even more carbon-metal bonds, such as 1,5-dilithiopentane, may be advantageously employed, however. These dimetallic initiators yield polymer anions propagating at two ends so that for each increment of monomer added after the first, two additional block segments will be formed. The dimetallic initiators are an especially convenient means for preparing three-block copolymer systems.

In combination with the organolithium compound to form the initiator system of the present invention is a five- or six-membered heterocyclic compound or a fused ring system derived from a five- or six-membered heterocyclic compound wherein the heteroatom is a sulfur atom. The heterocyclic compound may be completely saturated or contain unsaturation. Only one sulfur heteroatom will be present in the monocyclic or fused ring systems. The sulfur heteroatom may be unsubstituted, such as in dibenzothiophene, or it may be substituted with one or two oxygen atoms, such as in dibenzothiophene 5-oxide or dibenzothiophene 5,5-dioxide. The oxygen atoms bonded to the sulfur heteroatom will not be a part of the ring structure.

Useful heterocyclic compounds of the above type include thiophene, thiophene 1-oxide, thiophene 1,1-dioxide, tetrahydrothiophene 1-oxide, tetrahydrothiophene 1,1-dioxide, $\Delta^2$-dihydrothiophene, 1-oxide, $\Delta^2$-dihydrothiophene 1,1-dioxide, $\Delta^3$-dihydrothiophene 1-oxide, $\Delta^3$-dihydrothiophene 1,1-dioxide, $\alpha$-thiapyran 1-oxide, $\alpha$-thiapyran 1,1-dioxide, $\gamma$-thiapyran 1-oxide, $\gamma$-thiapyran, 1,1-dioxide, $\Delta^2$-dihydrothiapyran 1-oxide, $\Delta^2$-dihydrothiapyran 1,1-dioxide, dihydrothiapyran 1-oxide, $\Delta^3$-dihydrothiapyran 1,1-dioxide, thianaphthene (benzothiophene), thianaphthene 1-oxide, thianaphthene 1,1-dioxide, $\Delta^2$-dihydrothianaphthene 1-oxide, $\Delta^2$-dihydrothianapthene 1,1-dioxide, tetrahydrothianaphthene 1-oxide, tetrahydrothianaphthene 1,1-dioxide, isothianaphthene, isothianaphthene 2-oxide, isothianaphthene 2,2-dioxide, 1,3-dihydroisothianaphthene, 1,3-dihydroisothianaphthene 2,2-dioxide, tetrahydroisothianaphthene, tetrahydroisothianaphthene 2-oxide, dibenzothiophene, dibenzothiophene 5-oxide, dibenzothiophene 5,5-dioxide or the like. Especially useful heterocyclic compounds for the present process are five-membered ring compounds or fused ring systems derived therefrom such as thiophene and dibenzothiophene and their derivatives. Excellent results have been obtained when dibenzothiophene, dibenzothiophene 5-oxide and dibenzothiophene 5,5-dioxide are employed.

The amount of the organolithium component employed will range between about 20 and 500 millimols per mol of the initial monomer charged and more preferably between 80 and 120 millimols per mol. The amount of initiator governs the molecular weight of the initial polymer block and may be varied accordingly. The organolithium compound and the heterocyclic compound will generally be present in essentially a 1:1 molar ratio. Molar ratios from about 3:1 to about 0.5:1 of the heterocyclic compound to the organolithium compound can be employed, however, It is often advantageous to employ a slight molar excess of the organolithium compound to serve as a scavenger in the polymerization system for the removal of any impurities which may be present.

In conducting the polymerizations the initiator system is utilized in a hydrocarbon solvent medium such as aromatic, paraffinic or cycloparaffinic hydrocarbons. Typically the same solvent employed for the polymerization medium will be used to make up the initiator solution. More often, however, the initiator components are individually charged to the polymerizer before the initial monomer charge. Useful hydrocarbons include propane, isobutane, n-pentane, isopentane, cyclopentane, hexane, cyclohexane, benzene, toluene, xylene or the like, and mixtures thereof.

The temperature of polymerization can range between about −80° C. to about 50° C. depending on the monomers employed. Excellent results have been obtained with the initiator system of this invention at temperatures between about −60° C. and 10° C. As various monomers are polymerized to form the block segments, the polymerization temperature may be varied as required. It is essential for the present process that a living polymer be maintained throughout the polymerization. Impurities such as oxygen, air, water, alcohols and the like must therefore be excluded from the polymerizer since their presence serves to terminate the growing polymer chains.

The polymerization will typically be conducted by charging the initial monomer to the polymerizer which contains the initiator system in a suitable solvent and conducting the polymerization for a time necessary to insure substantially complete conversion of the monomer. A second monomer will then be charged and polymerized. If additional monomers are to be polymerized to form additional blocks, the procedure will be repeated as required.

To recover the block polymers from the polymerization system conventional techniques are employed. Typically, when the polymerization of the final block segment is essentially complete, a terminating (short-stopping) agent such as water, methanol, ethanol or the like will be added in sufficient quantity to terminate the reaction. If desired, larger quantities may be added so that the polymer will be precipitated from the solution at the same time. It is sometimes more convenient to add the short stop in quantities sufficient to terminate the polymerization but not precipitate the polymer, then to add a stabilizing amount of a material such as phenyl-$\beta$-naphthylamine, 4-methyl-2,6-di-t-butylcresol or the like prior to the precipitation of the polymer.

Employing the present initiator systems a wide variety of useful block polymer compositions can be obtained by varying the monomers employed, the number of block segments, the sequence of the block segments and the molecular weight differences of the block segments. The present invention is particularly useful for the preparation of two- and three-block polymers. Heretofore there has been no convenient means for obtaining such block polymers when the block segments were derived from polar monomers.

Polar monomers which may be polymerized to obtain block polymers in accordance with the present invention include acrylonitrile, methacrylonitrile, alkyl acrylates and alkyl methacrylates wherein the alkyl substituent contains from one to eight carbon atoms. Such alkyl acrylates and methacrylates include ethyl acrylate, butyl acrylate, 2-ethylhexyl acrylate, methyl methacrylate, ethyl methacrylate, isopropyl methacrylate, 2-ethylhexl methacrylate and the like. The present process is particularly advantageous for the formation of two- and three-block copolymers derived from methacrylonitrile and methyl methacrylate. Block copolymers containing more than three polymer block segments may also be prepared in accordance with the present invention.

Any combination of the polar monomers may be block polymerized, in any order, employing the present process. This is contrary to previously known anionic processes where, if polar monomers could be polymerized, they had to be either homopolymerized or polymerized as the terminal block segment due to the tendency to terminate the growing chains. The initiator systems of the present invention permit the polymer anion obtained with polar monomers to propagate freely with a minimum of termination.

The block copolymers obtained by the present invention are useful in a wide variety of applications. They are typically thermoplastic materials having excellent clarity, good low temperature properties and solvent resistance, and are readily processable. The block polymers may be molded or extruded into a variety of shaped products. Shoe soles, weather seals and tubing constitute useful applications for these block polymers. Solutions of these block polymers can be used for impregnating fabrics to obtain useful gasket compositions.

The following Examples serve to illustrate the invention more fully. All parts and percentages are on a weight basis unless otherwise indicated. Viscosities reported are intrinsic viscosities measured at 30° C. for a solution of the polymer prepared by dissolving 0.1250 gram of the polymer in 25 ml. N,N-dimethylformamide.

In the Examples all solvents were distilled from calcium hydride under a nitrogen atmosphere and passed through 4 A. molecular sieves prior to use. The acrylonitrile, methacrylonitrile and alkyl acrylate and methacrylate monomers were distilled from calcium hydride and dried by passing through a 120 cm.×2 cm. molecular sieve column. All solvents and monomers were stored under nitrogen.

The polymerization procedure, unless indicated to the contrary, was to charge the polymerizer, which had been previously dried in an oven at 120° C. for a minimum of 18 hours and cooled and sealed under a nitrogen atmosphere, first with the solvent, then with the initiator and finally with the monomers. The organolithium compound was mixed with the heterocyclic compound in the polymerization solvent at room temperature. This solution was then cooled to −50° C. before the first monomer charge was made. Other monomers were then sequentially added to the polymerizer. The temperature of polymerization was −50° C. and polymerization times ranged between about 2 to 5 hours.

EXAMPLE I

Methyl methacrylate-methacrylonitrile block polymers were prepared by the sequential polymerization of monomers employing an n-butyl lithium/dibenzothiophene sulfone initiator system. The initiator system was prepared by charging 0.5 ml. (0.80 millimol) n-butyl lithium to 40 ml. toluene containing 0.10 gram dibenzothiophene. Two polymerizations were conducted employing this initiator system. In the first polymerization, 1 ml. (9.0 millimol) methyl methacrylate was initially charged to the polymerizer, allowed to polymerize for approximately 2 hours, and 1 ml. (12 millimol) methacrylonitrile charged and the polymerization continued for an additional 2 hours. In the second polymerization, 1 ml. (12 millimol) methacrylonitrile was first charged, allowed to polymerize, and 1 ml. (9.0 millimol) methyl methacrylate added. Both polymerizations were shortstopped after about 4 hours by the addition of 1 ml. of a 5 percent solution of HCl in methanol. The polymers were precipitated with cold hexane and dried in a 50° vacuum oven. Greater than 90 percent conversion of the total monomers was achieved in both polymerizations and the intrinsic viscosities of the polymers were 4.4 and 2.55, respectively.

Block copolymerization was confirmed by gas chromatographic analysis of the reaction mixture prior to the addition of the second monomer and also prior to the addition of the short-stopping agent. When the methacrylonitrile was employed as the first monomer the conversion after 2 minutes time was nearly 60 percent and after 30 minutes polymerization about 95 percent or greater conversion was obtained. The methacrylonitrile conversion was determined by short stopping at various reaction times and recovering the polymer formed to that point and confirmed by vapor phase chromatographic analysis of the polymerization mixture.

Employing similar polymerization techniques methyl methacrylate-methacrylonitrile block copolymers were obtained with this n-butyl lithium/dibenzothiophene sulfone initiator system employing hexane as the polymerization solvent at −25° C. Also mixtures of hexane and toluene were found to be convenient and useful polymerization media for conducting the present block copolymerizations.

EXAMPLE II

Block polymerizations of methyl methacrylate and methacrylonitrile were conducted using varying amounts of dibenzothiophene sulfone. Three polymerizations were conducted. The recipes were as follows:

| | A | B | C |
|---|---|---|---|
| Toluene (ml.) | 40 | 40 | 40 |
| n-Butyl lithium (ml.) | 0.5 | 0.05 | 0.5 |
| Dibenzothiophene sulfone (grams) | 0.03 | 0.05 | 0.07 |

Each polymerizer was then charged with 1 ml. (9.0 millimol) methyl methacrylate and allowed to polymerize for 1 hour and followed by 1 ml. (12 millimol) methacrylonitrile. The polymerizations were continued for an additional 2 hours and short stopped with 1 ml. of a 5 percent HCl/methanol solution. Near quantitative conversion of the monomers was obtained with C. Block copolymers were also obtained with A and B.

EXAMPLE III

Methacrylonitrile and methyl methacrylate were block polymerized as follows: 3 grams (14 millimol) dibenzothiophene sulfone and 12 ml. (19 millimol) n-butyl lithium were charged at room temperature to 1,500 ml. toluene charged in a 2 liter polymerizer. The reactor and its contents were cooled to about −50° C. and 25 ml. (225 millimol) methyl methacrylate added with stirring over about a 2 hour period. The polymerization was stirred for an additional 2 hours followed by the addition of 25 ml. (300 millimol) methacrylonitrile over 2 hours. After 16 hours the polymerization was short stopped with 5 ml. of 5 percent HCl in methanol. The methyl methacrylate-methacrylonitrile block copolymer was precipitated with cold hexane, washed and dried at 50 ° in a vacuum oven. 98 percent conversion of the monomers was obtained. The block copolymer had a viscosity of 1.98 and glass transition temperatures of 68° C. and 98 −104° C. Nitrogen analysis showed 8.5 percent nitrogen present in the polymer which corresponds to about 40 percent methacrylonitrile.

EXAMPLE IV

Employing the same procedure as described in Example III and the same initiator system, methacrylonitrile (25 ml., 300 millimol) was first polymerized for about 2 hours. Methyl methacrylate (25 ml., 225 millimol) was then added and the polymerization continued for about 16 hours. The methacrylonitrilemethyl methacrylate block copolymer obtained had an intrinsic viscosity of 1.11. The polymer had glass transition temperatures of 62° C. and 108–110° C.

EXAMPLE V

Similarly, three-block copolymers were prepared by the sequential polymerization of increments of methacrylonitrile, methyl methacrylate and methacrylonitrile, in that order. 75 ml. portions of the monomers were employed for each charge. The polymerization was conducted at −50° C. and the polymerization times after the addition of the first and second monomers was about 1 hour. The total polymerization time was about 17 hours. The methacrylonitrile-methyl methacrylate-methacrylonitrile three-block copolymer was precipitated with acidified methanol and washed with distilled water. The polymer was obtained as a colorless powder.

EXAMPLE VI

A three-block copolymer methyl methacrylate-methacrylonitrile-methyl methacrylate was prepared. 75 ml. portions of the monomers were sequentially charged to the 5 liter polymerizer containing 3,400 ml. toluene, 45 ml. (72 millimol) n-butyl lithium and 12 grams (55.5 millimol) dibenzothiophene sulfone. A 95.6 percent total conversion of the monomers was obtained. The polymer contained 6.30 percent nitrogen by analysis. Physical properties were obtained with an Instron Tester on a sample of the polymer injection molded at 180° C. At a pull rate of 10 in./min. (room temperature) the polymer elongated 3.5 percent, had a modulus of about $3.5 \times 10^5$ and the tensile at break was about 11,400 p.s.i.

EXAMPLE VII

Employing a similar procedure to that described in example I, acrylonitrile and ethyl acrylate were block copolymerized. Two polymerizations were conducted. In the first, ethyl acrylate was the initial monomer charge followed by acrylonitrile and, in the second, acrylonitrile was the initial monomer charged followed by ethyl acrylate. In both instances monomer conversions were high. The resulting polymers were rubbery and could be elongated to several times their original length.

EXAMPLE VIII methacrylonitrile and methyl methacrylate were block copolymerized. The initiator system employed was prepared by charging 0.5 ml. (0.80 millimol) n-butyl lithium to 40 ml. toluene containing 0.0650 gram (0.48 millimol) thianaphthene. Copolymerizations were conducted both with methyl methacrylate as the initial monomer and with methacrylonitrile as the initial monomer. High polymer yields were obtained in both instances.

EXAMPLE IX

A dibenzothiophene/n-butyl lithium initiator system was prepared by dissolving 0.4607 gram (2.5 millimol) dibenzothiophene in 200 ml. toluene. Forty ml. (0.5 millimol dibenzothiophene) of this solution, to which 0.5 ml. (0.80 millimol) n-butyl lithium was added, was used for the block copolymerization of methyl methacrylate and methacrylonitrile. The block copolymer had a slight yellowish coloration but was obtained in good yield with a high intrinsic viscosity.

EXAMPLE X

Employing the same procedure as described in Example I, methacrylonitrile and methyl methacrylate were block polymerized with an n-butyl lithium/tetramethylene sulfone initiator system. 0.0603 gram (0.50 millimol) tetramethylene sulfone and 0.5 ml. (0.80 millimol) n-butyl lithium was employed per 40 ml. toluene. The block copolymers obtained had intrinsic viscosities as high as 0.95.

EXAMPLE XI

Using the procedure of example X except that 0.052 gram (0.50 millimol) tetramethylene sulfoxide was substituted for the tetramethylene sulfone, methyl methacrylate and methacrylonitrile were block copolymerized. Excellent monomer conversion was obtained. The methyl methacrylate-methacrylonitrile block copolymer had a viscosity of 1.81.

I claim:

1. A composition for block copolymerizing polar monomers comprising: (1) an organolithium compound of the formula $R{-}(Li)_x$ wherein R is an aliphatic, aromatic or cycloaliphatic hydrocarbon radical containing from one to 12 carbon atoms and $x$ is 1 or 2; and (2) a heterocyclic compound selected from the group consisting of five- and six-membered heterocycles and fused ring systems of five- and six-membered heterocycles wherein the heteroatom is a sulfur atom, said heterocyclic compound containing only carbon, hydrogen and sulfur, with the sulfur atom being unsubstituted or substituted with one or two oxygen atoms; the molar ratio of (2) to (1) being from about 3:1 to about 0.5:1.

2. The composition of claim 1 wherein (1) is an alkyl lithium compound where the alkyl group contains from one to six carbon atoms and (2) is a five-membered heterocyclic compound or a fused ring system of a five-membered heterocyclic compound.

3. The composition of claim 2 wherein (1) is n-butyl lithium and the molar ratio of (2) to (1) is essentially 1:1.

4. The composition of claim 3 wherein (2) is dibenzothiophene.

5. The composition of claim 3 wherein (2) is dibenzothiophene 5-oxide.

6. The composition of claim 3 wherein (2) is dibenzothiophene 5,5-dioxide.